(12) United States Patent
Fusegi

(10) Patent No.: US 7,862,462 B2
(45) Date of Patent: Jan. 4, 2011

(54) DIFFERENTIAL DEVICE

(75) Inventor: Masaaki Fusegi, Shimotsuga-gun (JP)

(73) Assignee: GKN Driveline Torque Technology KK, Toshigi-Ken, Toshigi-Shi (JP)

( * ) Notice: Subject to any disclaimer, the term of this patent is extended or adjusted under 35 U.S.C. 154(b) by 398 days.

(21) Appl. No.: 11/707,451

(22) Filed: Feb. 16, 2007

(65) Prior Publication Data

US 2007/0197338 A1 Aug. 23, 2007

(30) Foreign Application Priority Data

Feb. 20, 2006 (JP) .............................. 2006-042853

(51) Int. Cl.
*F16H 48/06* (2006.01)
*F16H 48/20* (2006.01)
*F16H 48/22* (2006.01)
*F16H 48/30* (2006.01)

(52) U.S. Cl. ................. 475/231; 475/235; 475/238; 475/240; 475/250; 475/249

(58) Field of Classification Search ................. 475/223, 475/231, 235, 237–238, 240, 249, 250
See application file for complete search history.

(56) References Cited

U.S. PATENT DOCUMENTS

| | | | | |
|---|---|---|---|---|
| 4,703,671 A | * | 11/1987 | Jikihara | ........................ 475/86 |
| 6,966,863 B2 | * | 11/2005 | Teraoka et al. | ............... 475/154 |
| 7,247,118 B2 | * | 7/2007 | Haruki et al. | ............... 475/231 |
| 7,264,569 B2 | * | 9/2007 | Fox | ............................ 475/241 |
| 7,325,664 B2 | * | 2/2008 | Fusegi | ...................... 192/84.92 |
| 7,534,187 B2 | * | 5/2009 | Donofrio et al. | ............ 475/231 |
| 2004/0132572 A1 | * | 7/2004 | Ludwig et al. | ............... 475/150 |
| 2005/0279607 A1 | * | 12/2005 | Fusegi | ...................... 192/84.96 |
| 2006/0154776 A1 | * | 7/2006 | Claussen et al. | ............ 475/231 |

FOREIGN PATENT DOCUMENTS

| | | |
|---|---|---|
| JP | 11-063160 A | 3/1999 |
| JP | 11-210863 A | 8/1999 |
| JP | 2004-183874 | 7/2004 |
| JP | 2008-527274 A | 7/2008 |
| WO | WO-2006/075246 A1 | 7/2006 |

OTHER PUBLICATIONS translation of JP11210863A Apr. 29, 2010.*
translation of JP2004183874A Apr. 29, 2010.*
Notice of Rejection Reasons mailed Mar. 23, 2010, for JP Patent Application No. 2006-042853, with English Translation, 10 pages.

* cited by examiner

*Primary Examiner*—Tisha D Lewis
(74) *Attorney, Agent, or Firm*—Morrison & Foerster LLP

(57) ABSTRACT

A differential device is provided with a case being capable of rotation around a rotation axis; a differential gear set housed in and drivingly coupled to the case, which includes first and second output gears and is configured to differentially transmit the rotation of the case to the first and second output gears; a clutch configured to controllably limit and free a differential motion between the first and second output gears, which is housed in the case; an actuator configured to actuate the clutch; and a notifying member configured to notify whether the differential motion is limited or freed to an exterior of the case.

13 Claims, 7 Drawing Sheets

US 7,862,462 B2

DIFFERENTIAL DEVICE

CROSS-REFERENCE TO RELATED APPLICATIONS

This application is based upon and claims the benefit of priority from the prior Japanese Patent Application No. 2006-042853 (filed Feb. 20, 2006); the entire contents of which are incorporated herein by reference.

BACKGROUND OF THE INVENTION

1. Field of the Invention

The present invention relates to a differential device applied to conveyance means such as automobiles, differential motion of which is controllable and detectable from the exterior thereof.

2. Description of the Related Art

As is known, an automobile is equipped with a differential to distribute a driving force of an engine to right and left output axles. The differential allows a differential motion between the axles and hence right and left wheels can maintain traction with the road while the automobile is turning.

To provide a driver with operability for temporary lock of the differential motion, a so-called "Lock-up Differential" is used. The lock-up differential in general has a clutch for locking the differential motion and an actuator for actuating the clutch under control by the driver. The lock-up differential may be required to be equipped with a means for canceling the lock of the differential motion and another means for detecting whether the differential motion is locked or freed.

Installing the clutch and these means in a casing of the differential leads to complexity of a structure and inaccessibility to these elements. These are considerable disadvantages on occasions of assembly, maintenance and repair.

SUMMARY OF THE INVENTION

In accordance with a first aspect of the present invention, a differential device is provided with a case being capable of rotation around a rotation axis; a differential gear set housed in and drivingly coupled to the case, which includes first and second output gears and is configured to differentially transmit the rotation of the case to the first and second output gears; a clutch configured to controllably limit and free a differential motion between the first and second output gears, which is housed in the case; an actuator configured to actuate the clutch; and a notifying member configured to notify whether the differential motion is limited or freed to an exterior of the case.

In accordance with a second aspect of the present invention, a differential device is provided with: a case being capable of rotation around a rotation axis; a differential gear set housed in and drivingly coupled to the case, which includes first and second output gears and is configured to differentially transmit the rotation of the case to the first and second output gears; a clutch having an engaging position and a disengaging position, which is configured to limit a differential motion between the first and second output gears in the engaging position and free the differential motion in the disengaging position; an actuator configured to actuate the clutch between the engaging position and the disengaging position; and a follower member following the clutch to output whether the clutch is in the engaging position or the disengaging position to an exterior of the case.

BRIEF DESCRIPTION OF THE DRAWINGS

FIG. 1 illustrates a state of freeing the differential motion and FIG. 2 illustrates a state of locking the differential motion;

DETAILED DESCRIPTION OF THE PREFERRED EMBODIMENT

An embodiment of the present invention will be described hereinafter with reference to the appended drawings. Throughout the specification, claims and the drawings, some terms are specially defined in accordance with the following definitions unless any other particular explanations are given. An axial direction is defined as a direction along an axis of a differential device, which is generally correspondent to lateral directions of FIGS. 1-3. Ends are defined as extremes in the axial direction. An end face is defined as a face visible in a projection drawn along the axial direction.

FIGS. 1-7 illustrates a differential device 1 in accordance with the embodiment of the present invention. In the following description, the right and the left are correspondent to those of FIGS. 1-3.

Figure 1:
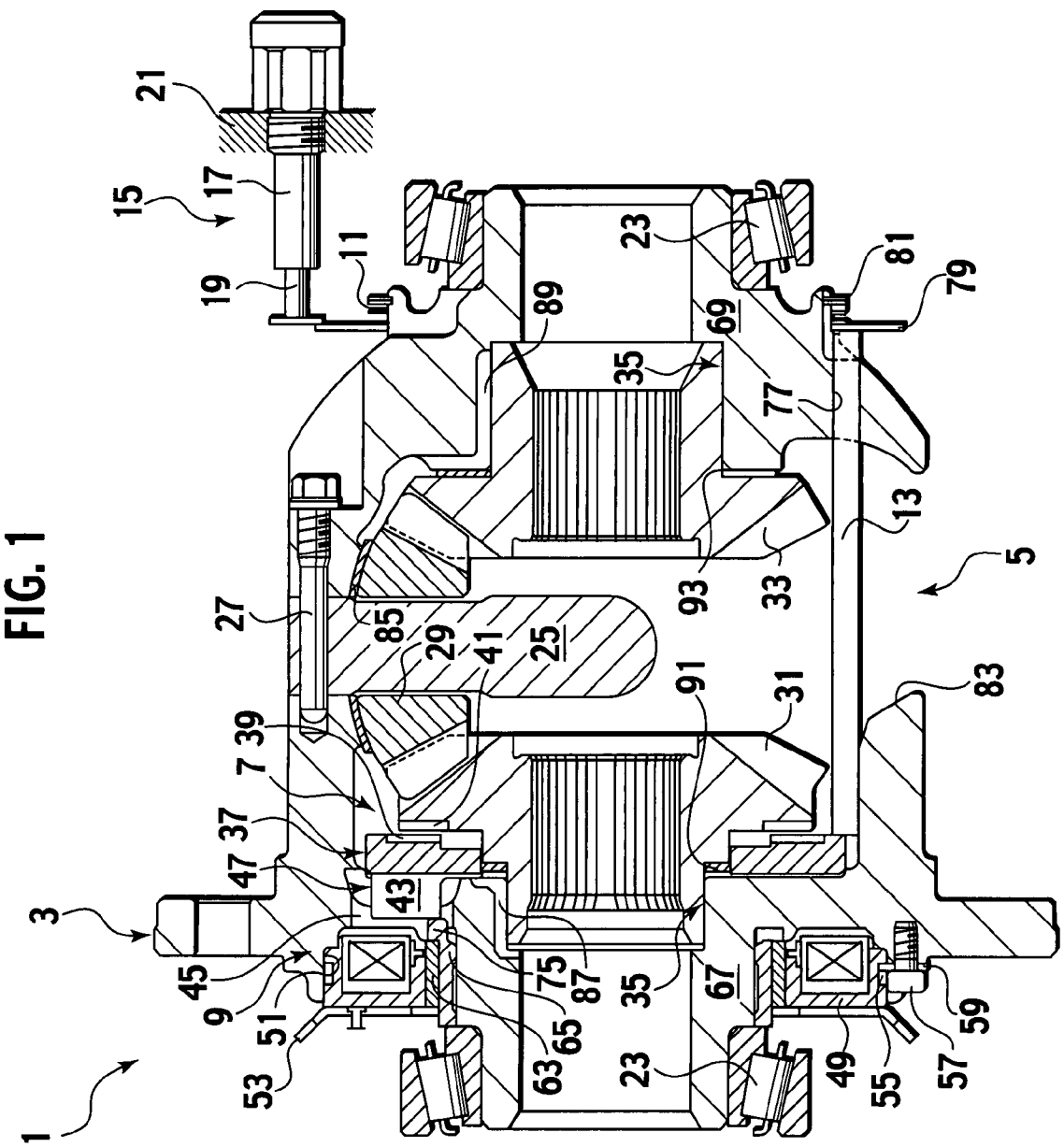
FIGS. 1 and 2 are sectional views of a differential device in accordance with an embodiment of the present invention, as being taken from a line I-I of FIG. 4; where
Figure 2:
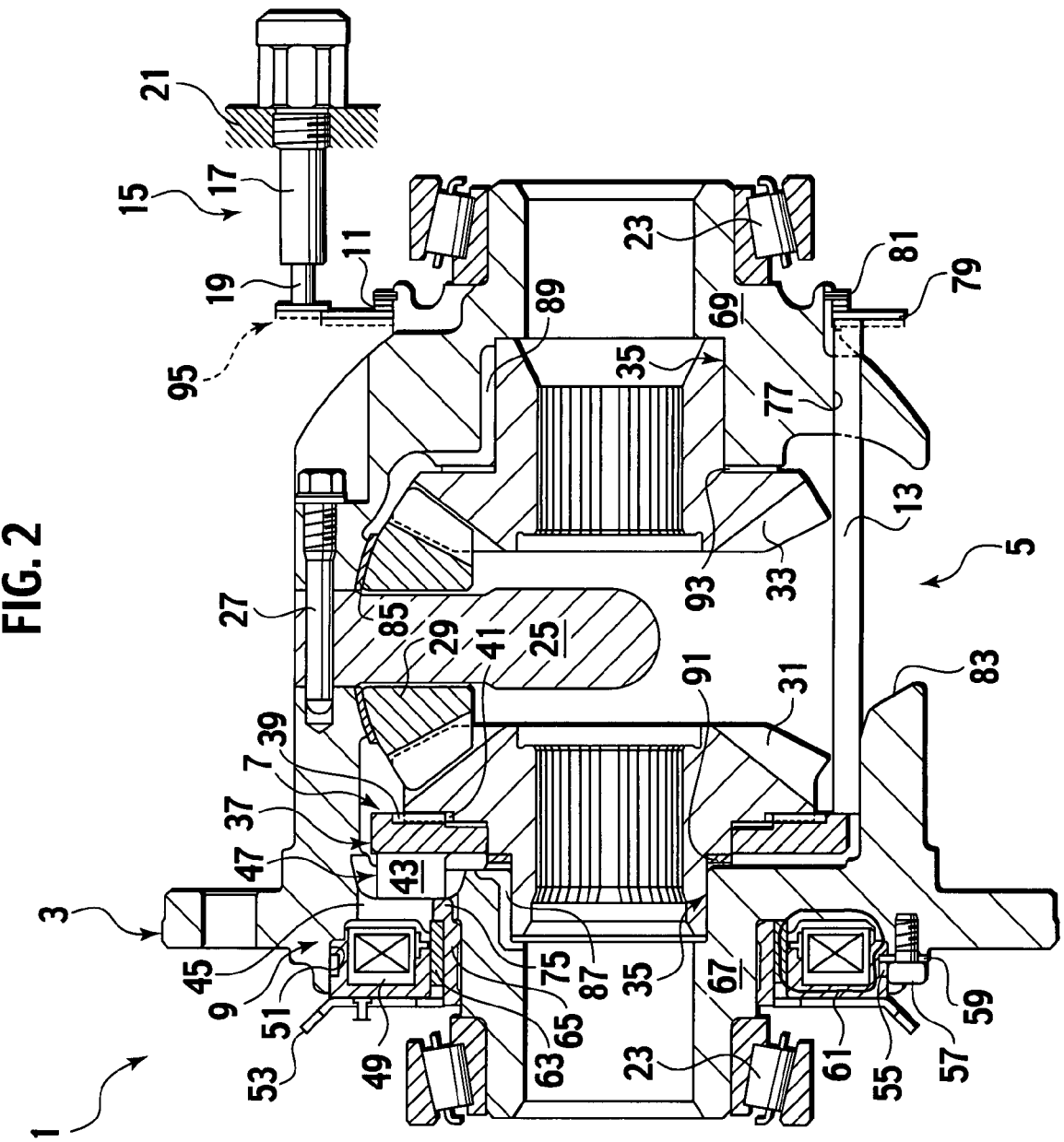

Referring to FIGS. 1 and 2, the differential device 1 is provided with a differential gear set 5 of, but not limited to, a bevel gear type so as to differentially transmit a driving force of an engine from a differential case 3 to right and left axles linked with side gears 31 and 33, a clutch 7 for locking (or limiting) the differential motion of the differential gear set 5, a solenoid 9 for actuating the clutch 7 into an engaging state, a return spring 11 for urging the clutch 7 into a disengaging state, and shafts 13 to output a motion of the clutch 7 to the exterior. Of course, the differential gear set is not limited to the bevel gear type but may use any other types such as a coupling type.

Boss portions 67 and 69 are formed in a unitary body with the differential case 3 so as to respectively project from right and left end faces of the differential case 3. The whole of the differential case 3 with the boss portions 67 and 69 is housed in a differential carrier 21. The boss portions 67 and 69 and the differential carrier 21 have bearings 23 interposed therebetween so that the differential case 3 is made rotatable relative to the differential carrier 21 around a rotation axis determined by the bearings 23.

The differential gear set 5 is provided with pinion shafts 25, pinion gears 29, and a pair of side gears 31 and 33. The differential case 3 supports the pinion shafts 25 in radial directions therein and bolts 27 respectively prevent the pinion shafts 25 from displacing. The pinion shafts 25 respectively rotatably support the pinion gears 29. The side gears 31 and 33 engage with the pinion gears 29 from respectively left and right sides. Internal surfaces of the side gears 31 and 33 are splined so as to drivingly engage with left and right axles. Thereby, the differential gear set 5 differentially transmits a driving force of an engine received by the differential case 3 to the left and right axles via the side gears 31 and 33.

Figure 3:
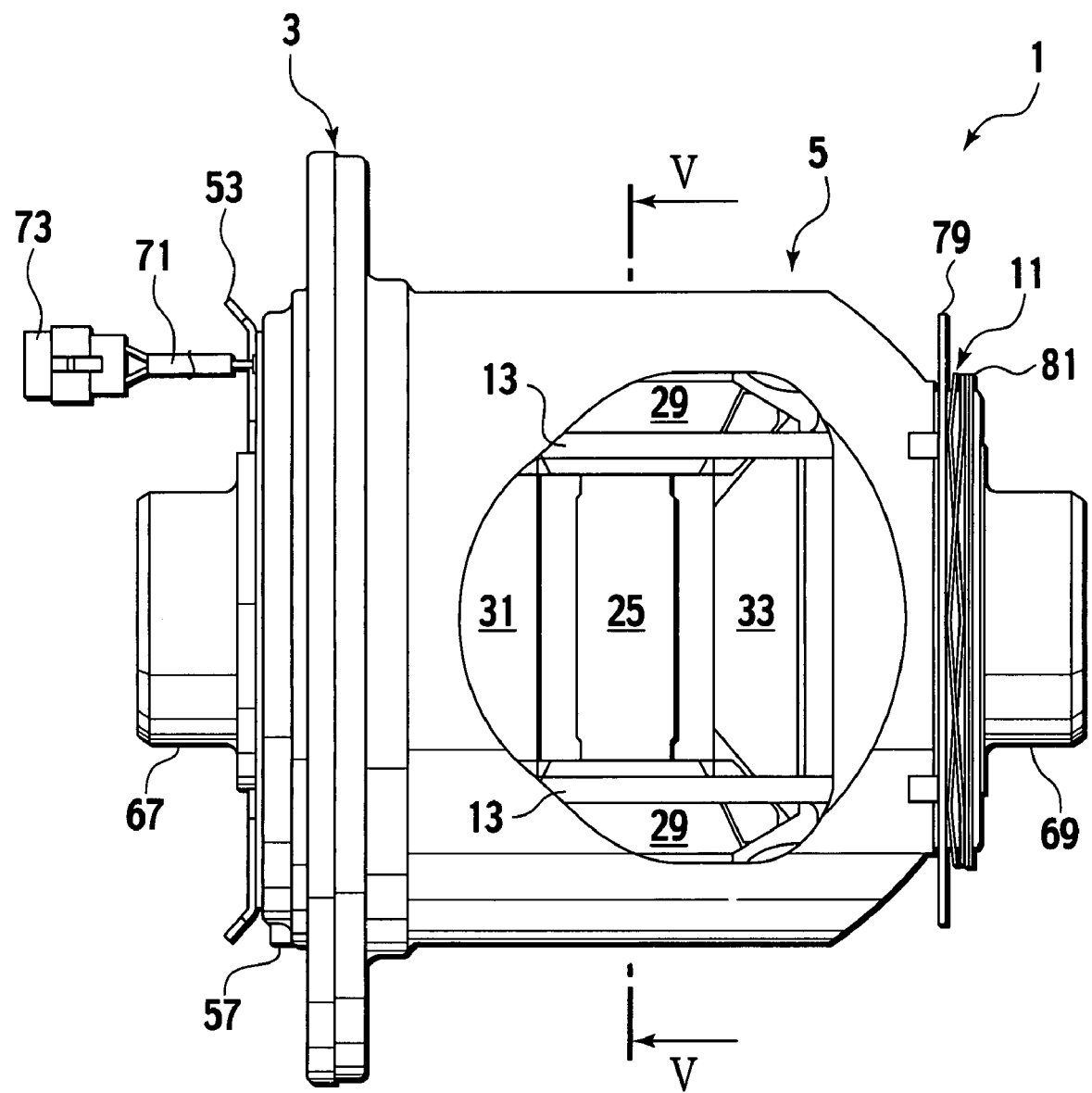
FIG. 3 is a front view of the differential device.
Figure 4:
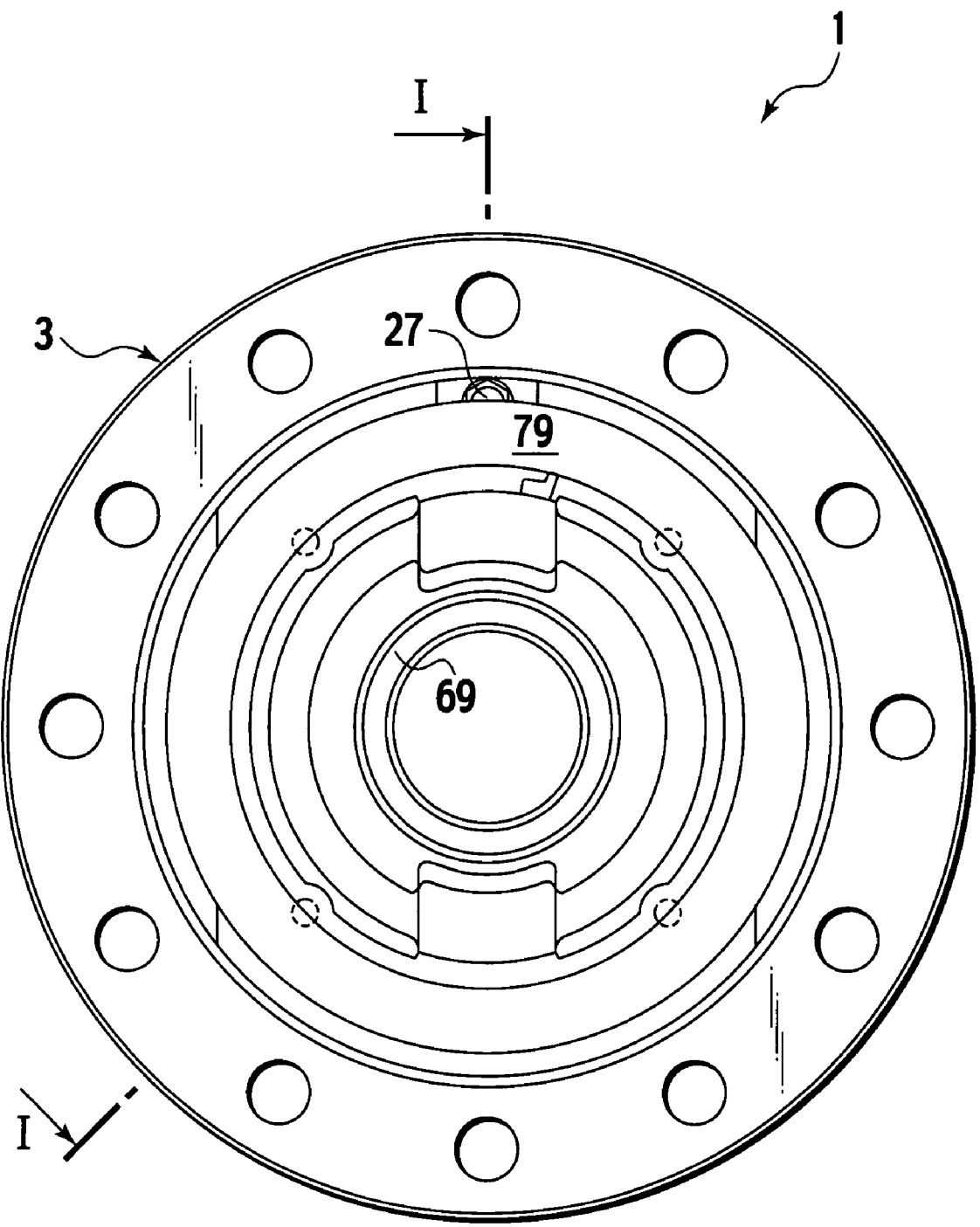
FIG. 4 is a side view of the differential device viewed from the right of FIG. 3.

Spherical washers 85 intervenes between the pinion gears 29 and the differential case 3 for smooth rotation of the pinion gears 29. Further, washers 91 and 93 respectively intervene between the side gears 31 and 33 and the differential case 3. Referring to FIG. 3, the differential case 3 has openings so dimensioned as to allow insertion of the gears 29, 31 and 33 therethrough. Oil reserved in the differential carrier 21 flows out of and into these openings of the differential case 3 to lubricate and cool meshing portions of these gears and any contact faces, such as contact faces 35 among the differential case 3 and the side gears 31 and 33, contact faces around the washers 91 and 93 and the spherical washers 85. For ease of circulation of the oil, an oil flow path 87 is held between the left side gear 31 and the differential case 3 and also an oil flow path 39 is held between the right side gear 33 and the differential case 3.

Referring again to FIGS. 1 and 2, as facing to the left side gear 31, a clutch ring 37 having teeth 39 is provided. Correspondingly the left side gear 31 is provided with teeth 41. These teeth 39 and 41 compose the clutch 7 for locking and freeing the differential motion of the differential gear set 5. In the present embodiment, though the clutch 7 is formed to be a dog clutch, any other clutch such as a frictional clutch or a multi-plate clutch may be also applicable. The clutch ring 37 is supported by the internal periphery of the differential case 3 to be axially movable. The clutch ring 37 is provided with projections 43 for receiving actuation by the solenoid 9.

The left end face of the differential case 3 has a support portion 51 formed to be a circular internal periphery thereof for supporting the solenoid 9 in a radial direction. The solenoid 9 fits in the support portion 51 though they are capable of rotating relative to each other. Plural (three in this example) sets of plates 59 for engagement with the solenoid 9, and pairs of bolts 57 for fixation of the plates 59 to the differential case 3. The fixation of the plates 59 to the differential case 3 may be made by welding instead of the bolts 57. The left end face of the differential case 3 has openings 45 through which the projections 43 of the clutch ring 37 and projections 75 of ring 65 (described later) are capable of abutting on each other.

The solenoid 9 slidably fits in and is hence supported by the support portion 51. The solenoid 9 is provided with a winding for conducting an electric current and a core 49 incompletely enclosing the winding. A lead line 71 is led out of the solenoid 9 and further led out of the differential carrier 21 as shown in FIG. 3. The connector 73 is to link with a battery via a controller (not shown). Thereby the solenoid 9 generates a magnetic flux under control by the controller. A plunger 63 is axially movably fit in the core 49. The core 49 in combination with the differential case 3 and the plunger 63 substantially completely encloses the winding to conduct the magnetic flux. The magnetic flux drives the plunger 63 in the axial direction toward the clutch 7.

Figure 6:
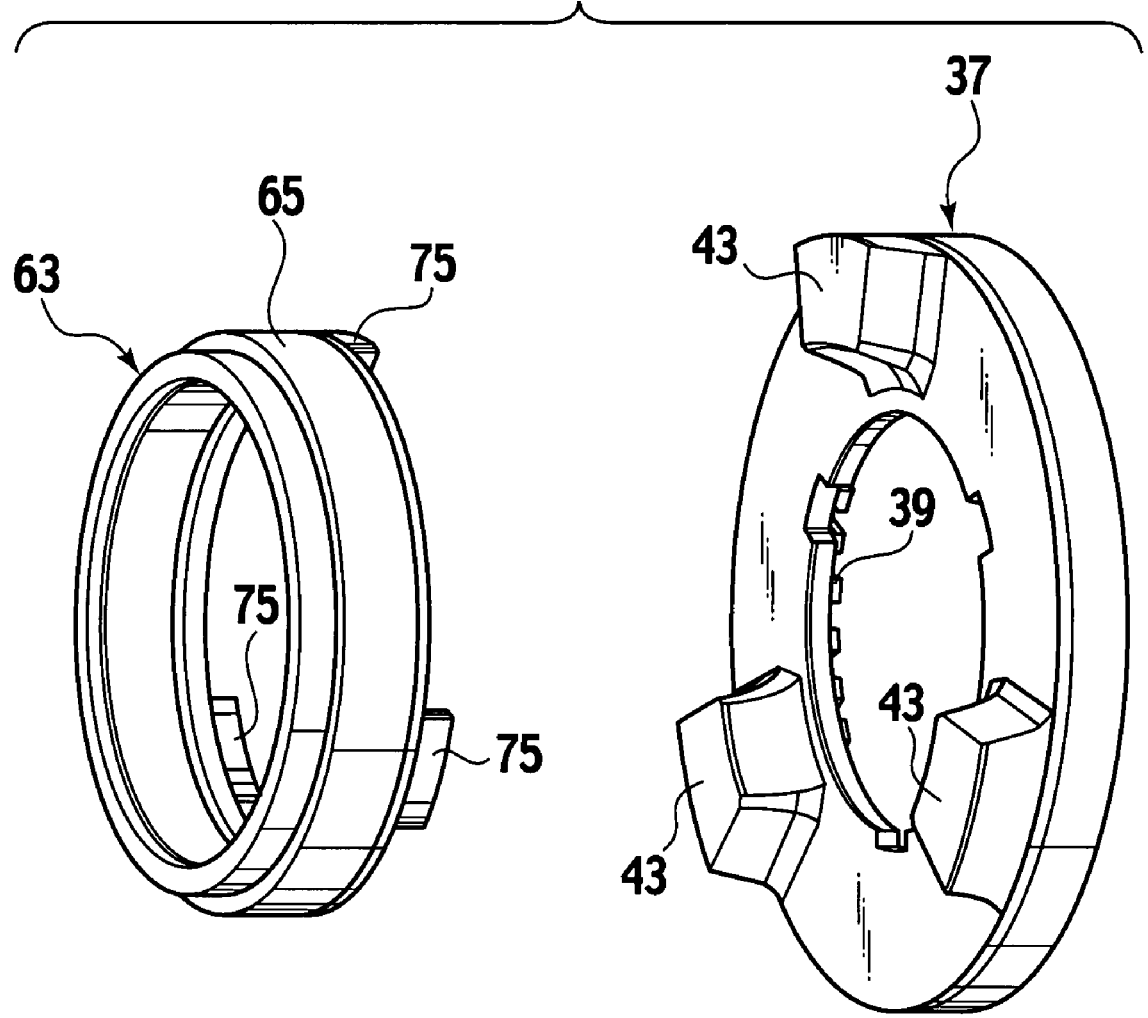
FIG. 6 is a perspective view of a plunger and a clutch ring for the differential device.
Figure 7:
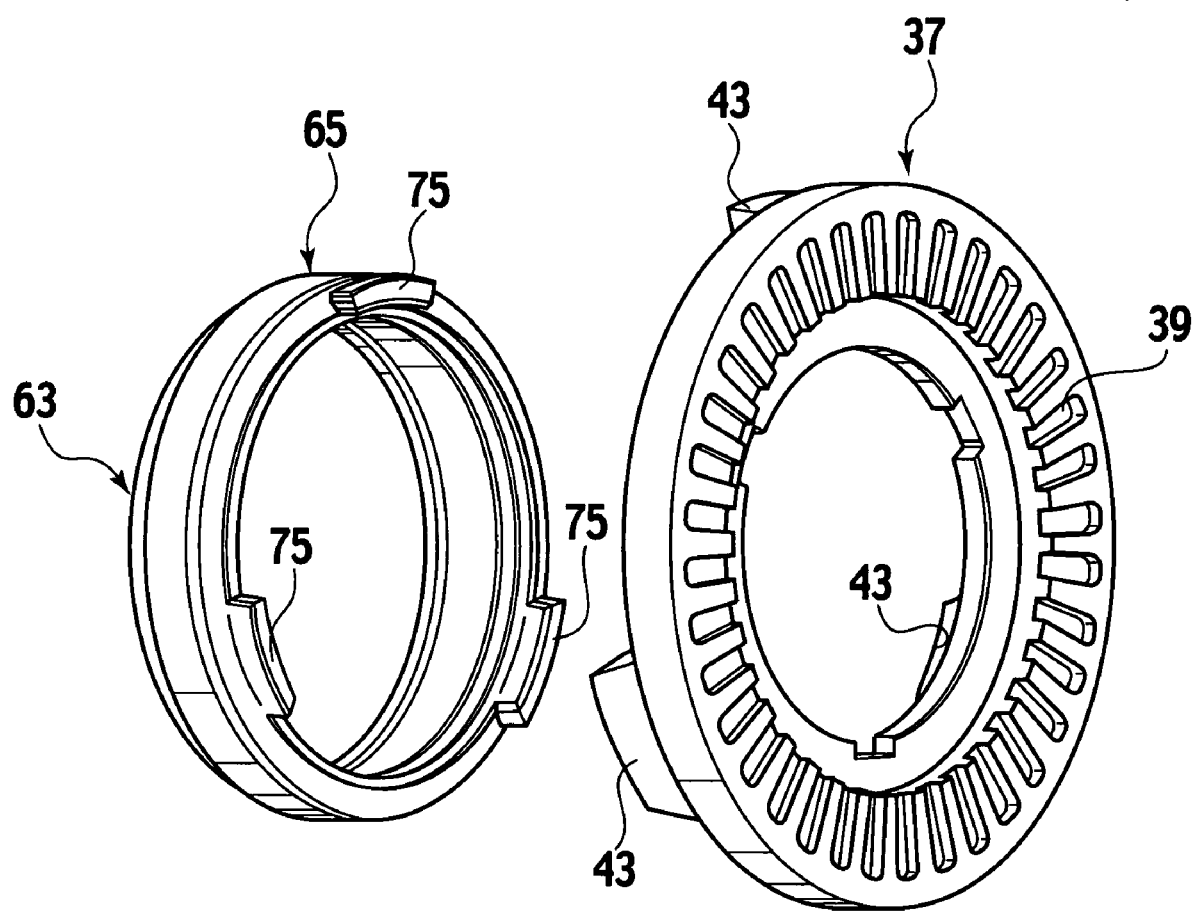
FIG. 7 is another perspective view of the plunger and the clutch ring.

A ring 65 fits in the plunger 63 for transmitting the movement of the plunger 63 to the clutch ring 37. Referring to FIGS. 6 and 7, the ring 65 is provided with plural (three in this example) projections 75 as facing to the projections 43 of the clutch ring 37. The projections 43 and 75 slidably engage with the openings 45 of the differential case 3 so that the clutch ring 37 and the ring 65 are rotated unitarily with the differential case 3.

Referring again to FIGS. 1-3, the core 49 of the solenoid 9 has anti-rotation members 53 for anti-rotation of the solenoid 9, which are spot-welded with the core 49. The anti-rotation members 53 respectively latch with recesses formed on a differential carrier so that the solenoid 9 is made anti-rotated.

As the projections 43 respectively face to the projections 75, axial motion of the plunger 63 toward the clutch 7 (rightward in FIGS. 1 and 2) is transmitted to the clutch 7 via the butted projections 43 and 75 so that the clutch 7 is made engaged. Both the projections 43 and the openings 45 have correspondent side faces formed obliquely to the rotation direction. A combination of these oblique side faces of the projections 43 and the openings 45 compose a cam 47 for converting torque of the differential case 3 into an axial force on the clutch ring 37 to assist the engagement of the clutch 7.

Figure 5:
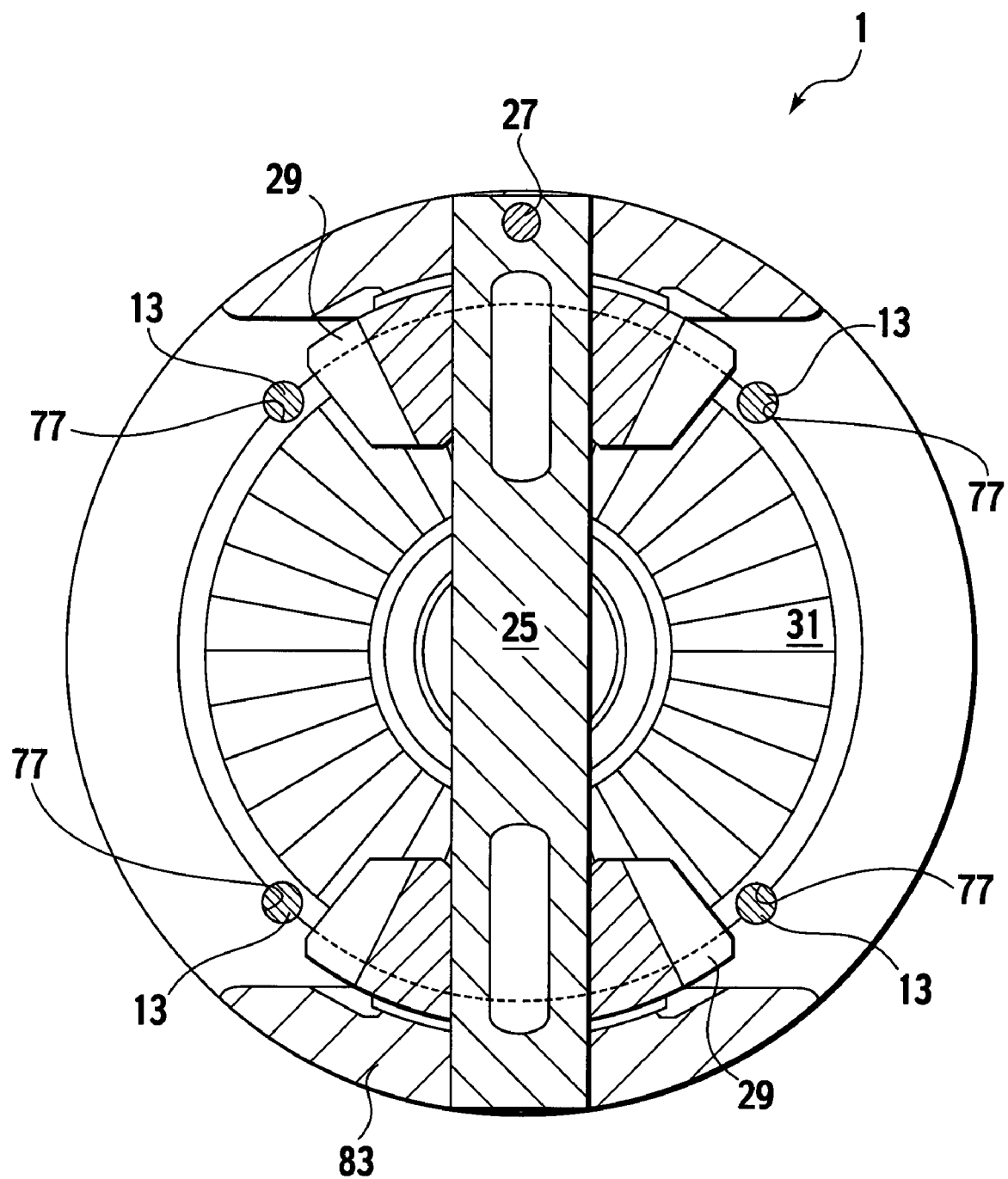
FIG. 5 is a sectional view of the differential device taken from a line V-V of FIG. 3.

Further referring to FIG. 5, plural (four in this example) shafts 13 movably penetrate the differential case 3 through through-holes 77 thereof along the axial direction. One end of each shaft 13 projects out of a right end face of the differential case 3 and another end abuts on the clutch ring 37 so as to follow the axial motion of the clutch ring 37. The projecting ends of the shaft 13 are fixed with a ring plate 79. The return spring 11 repulsively intervenes between the ring plate 79 and a snap ring 81 fixed with the differential case 3. Thereby, the return spring 11 urges the shafts 13 toward the clutch ring 37 and consequently the clutch ring 37 is urged into the disengaging state. Thereby, the clutch 7 stays in the disengaging state unless the solenoid 9 gives a force to the clutch 7.

The differential device 1 is further provided with a sensor 15 for detecting displacement of the shaft 13. The sensor 15 is provided with a detector portion 17 and a retractable probe 19 forced outward by a spring. The probe 19 is in touch with the ring plate 79 to follow displacement thereof. The detector portion 17 detects and converts displacement of the probe 19 into ON/OFF signals and output the signals to the controller.

When the solenoid 9 is excited, the generated magnetic flux drives the plunger 63 in the axial direction to drive the clutch 7 from a disengaging state into an engaging state. Thereby, the differential motion of the differential gear set 5 is locked. Then the cam 47 converts torque of the differential case 3 into an axial force for pressing the clutch ring 37 toward the left side gear 31 so that the engagement of the clutch 7 is prevented from being cancelled by shock or such. Then the engaging state of the clutch 7, which means that the differential gear set 5 is locked, is notified to the sensor 15. The sensor 15 outputs the ON signal to the controller to notify the engaging state to the driver.

When excitation is cancelled, the return spring 11 urges the shafts 13 leftward in FIG. 1 to return the clutch 7 into the disengaging state so that the clutch 7 is disengaged and the differential motion of the differential gear set 5 is freed. Then the disengaging state of the clutch 7, which means that the differential gear set 5 is freed, is notified to the sensor 15. The sensor 15 outputs the OFF signal to the controller to notify the disengaging state to the driver.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device comprising:
   a case being capable of rotation around a rotation axis;
   a differential gear set housed in and drivingly coupled to the case, the differential gear set including first and second output gears and being configured to differentially transmit the rotation of the case to the first and second output gears;
   a clutch configured to controllably limit and free a differential motion between the first and second output gears, the clutch being housed in the case;
   an actuator configured to actuate the clutch;

a notifying member configured to notify whether the differential motion is limited or freed to an exterior of the case; and an elastic body configured to urge the clutch into a state of freeing the differential motion, the elastic body having the notifying member interposed between the elastic body and the clutch.

2. The differential device of claim 1, wherein the actuator includes a solenoid and a plunger driven by the solenoid to actuate the clutch.

3. The differential device of claim 1, wherein the notifying member is drivingly coupled with the clutch to follow a motion of the clutch.

4. The differential device of claim 3, wherein the actuator is supported at an axially first end face of the case and the notifying member is projected from an axially second end face of the case.

5. The differential device of claim 4, wherein the actuator comprises a plunger for actuation of the clutch, a solenoid configured to generate a magnetic flux for driving the plunger, and a magnetic core slidably fitting on the solenoid and the first end face of the case, the magnetic core in combination with the first end face of the case and the plunger being so dimensioned as to surround the solenoid.

6. The differential device of claim 1, further comprising:
a sensor configured to detect a displacement of the notifying member.

7. The differential device of claim 6, wherein the sensor includes a movable body in touch with the notifying member and a detector configured to detect a position of the movable body.

8. A differential device comprising:
a case being capable of rotation around a rotation axis;
a differential gear set housed in and drivingly coupled to the case, the differential gear set including first and second output gears and being configured to differentially transmit the rotation of the case to the first and second output gears;

a clutch having an engaging position and a disengaging position, the clutch being configured to limit a differential motion between the first and second output gears in the engaging position and free the differential motion in the disengaging position;

an actuator configured to actuate the clutch between the engaging position and the disengaging position;

a follower member following the clutch to output whether the clutch is in the engaging position or the disengaging position to an exterior of the case; and an elastic body configured to urge the clutch from the engaging position toward the disengaging position, the elastic body having the follower member interposed between the elastic body and the clutch.

9. The differential device of claim 8, wherein the actuator includes a solenoid and a plunger driven by the solenoid to actuate the clutch.

10. The differential device of claim 8, wherein the actuator is disposed at an axially first end face of the case and the follower member is projected from an axially second end face of the case.

11. The differential device of claim 10, wherein the actuator comprises a plunger for actuation of the clutch, a solenoid configured to generate a magnetic flux for driving the plunger, and a magnetic core slidably fitting on the solenoid and the first end face of the case, the magnetic core in combination with the first end face of the case and the plunger being so dimensioned as to surround the solenoid.

12. The differential device of claim 8, further comprising:
a sensor configured to detect the displacement, the sensor being coupled with the follower member.

13. The differential device of claim 12, wherein the sensor includes a movable body in touch with the follower member and a detector configured to detect a position of the movable body.

* * * * *